United States Patent
Warkentin et al.

(10) Patent No.: US 10,620,963 B2
(45) Date of Patent: Apr. 14, 2020

(54) PROVIDING FALLBACK DRIVERS FOR IO DEVICES IN A COMPUTING SYSTEM

(71) Applicant: VMware, Inc., Palo Alto, CA (US)

(72) Inventors: Andrei Warkentin, North Andover, MA (US); Cyprien Laplace, Boston, MA (US)

(73) Assignee: VMware, Inc., Palo Alto, CA (US)

( * ) Notice: Subject to any disclaimer, the term of this patent is extended or adjusted under 35 U.S.C. 154(b) by 253 days.

(21) Appl. No.: 15/654,206

(22) Filed: Jul. 19, 2017

(65) Prior Publication Data

US 2019/0026118 A1 Jan. 24, 2019

(51) Int. Cl.
*G06F 9/44* (2018.01)
*G06F 9/4401* (2018.01)
*G06F 8/656* (2018.01)
*G06F 9/455* (2018.01)

(52) U.S. Cl.
CPC ............ *G06F 9/4411* (2013.01); *G06F 8/656* (2018.02); *G06F 2009/45579* (2013.01)

(58) Field of Classification Search
CPC ................................. G06F 9/4411; G06F 8/67
See application file for complete search history.

(56) References Cited

U.S. PATENT DOCUMENTS

| | | | | |
|---|---|---|---|---|
| 7,886,185 B1 * | 2/2011 | Okcu | ................. | G06F 9/4411 711/162 |
| 8,132,186 B1 * | 3/2012 | Okcu | ................. | G06F 13/102 717/174 |
| 8,245,243 B1 * | 8/2012 | Neuendorffer | ........ | G06F 13/102 717/168 |
| 2013/0145052 A1 * | 6/2013 | Aiken | ................. | G06F 9/4411 710/9 |
| 2015/0268970 A1 * | 9/2015 | Mudusuru | .............. | G06F 9/4411 713/1 |
| 2016/0291986 A1 * | 10/2016 | Warkentin | ............ | G06F 9/4411 |
| 2016/0364243 A1 * | 12/2016 | Puthillathe | ............ | G06F 9/4411 |
| 2019/0005722 A1 * | 1/2019 | Murching | ............... | G06T 19/00 |

OTHER PUBLICATIONS

"Contributors, OS Driver installation, Apr. 19, 2017, 3 pages" https://docs.microsoft.com/en-us/windows-hardware/drivers/hid/os-driver-installation.*

* cited by examiner

*Primary Examiner* — Phil K Nguyen
(74) *Attorney, Agent, or Firm* — Patterson + Sheridan, LLP (57) ABSTRACT

A method of providing software support of an input/output (IO) device of a computing system having an advanced configuration and power interface (ACPI) subsystem executing therein is described. The method includes: processing an ACPI namespace to determine first and second identifiers of the IO device; determining absence of a device driver for the IO device based on the first identifier; and loading a first fallback device driver portion based on the second identifier, the first fallback device driver portion providing an interface to a control method in the ACPI namespace, the control method executable by the ACPI subsystem to implement a second fallback device driver portion that supports at least a portion of functionality for the IO device.

20 Claims, 5 Drawing Sheets

PROVIDING FALLBACK DRIVERS FOR IO DEVICES IN A COMPUTING SYSTEM

BACKGROUND

Some types of server platforms are not very homogeneous. While certain devices adhere to published specifications, a number of low-bandwidth on-board devices can have different implementations across server platforms. Such on-board devices include, for example, Inter-Integrated Circuit (I²C) controllers, serial peripheral interface (SPI) controllers, 1-wire controllers, general purpose input/output (GPIO) controllers, and the like. Operating systems need to provide drivers for these on-board devices to make use of them. To support the various server platforms, operating systems need to be configured with several different versions of drivers to match the different implementations of the on-board devices. It becomes onerous to the operating system developers to keep track of the different implementations of on-board devices and develop drivers for each of them. Also, should an operating system not provide a driver for a particular on-board device, the user will be unable to use (or will have limited use of) the on-board device.

SUMMARY

Techniques for providing fallback drivers for input/output (IO) devices in a computing system are described. In an embodiment, a method of providing software support of an input/output (IO) device of a computing system having an advanced configuration and power interface (ACPI) subsystem executing therein is described. The method includes: processing an ACPI namespace to determine first and second identifiers of the IO device; determining absence of a device driver for the IO device based on the first identifier; and loading a first fallback device driver portion based on the second identifier, the first fallback device driver portion providing an interface to a control method in the ACPI namespace, the control method executable by the ACPI subsystem to implement a second fallback device driver portion that supports at least a portion of functionality for the IO device.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
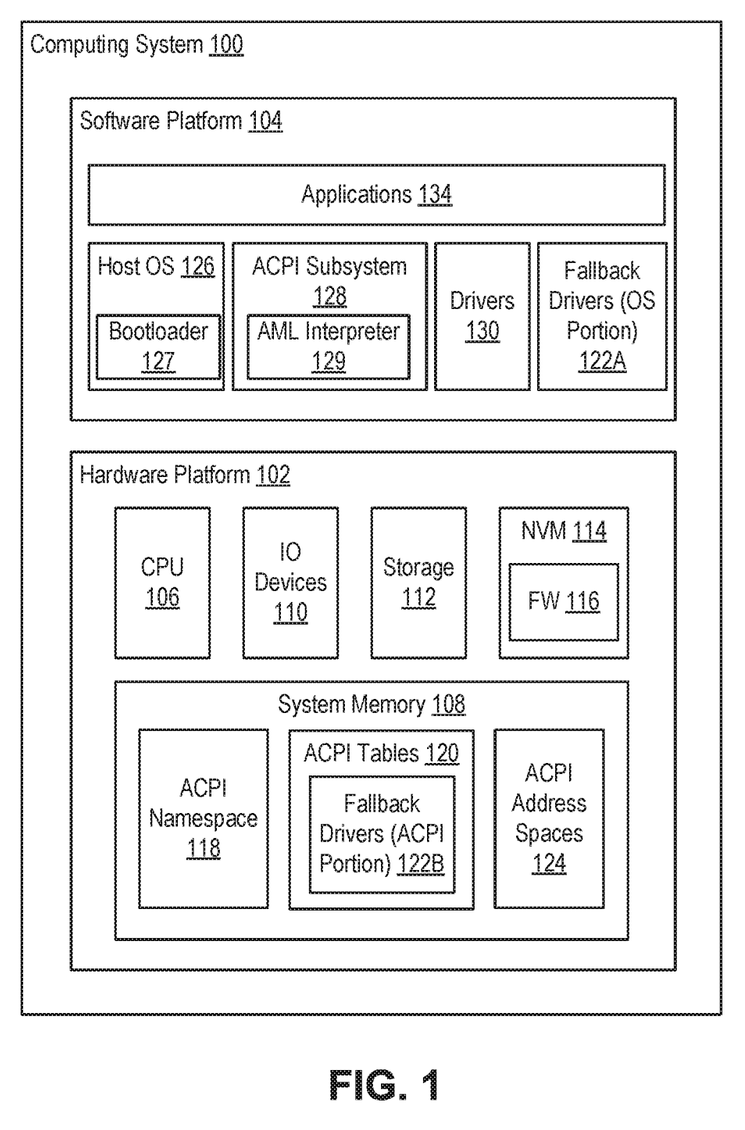
FIG. 1 is a block diagram depicting a computing system according to an embodiment.

FIG. 1 is a block diagram depicting a computing system 100 according to an embodiment. Computing system 100 includes a software platform 104 executing on a hardware platform 102. Hardware platform 102 may include conventional components of a computing device, such as a central processing unit (CPU) 106, a system memory 108, input/output (IO) devices 110, storage devices ("storage 112"), and non-volatile memory (NVM) 114. CPU 106 is configured to execute instructions, for example, executable instructions that perform one or more operations described herein and may be stored in system memory 108 and storage 112. System memory 108 is a device allowing information, such as executable instructions and data, to be stored and retrieved. System memory 108 may include, for example, one or more random access memory (RAM) modules.

CPU 108 includes one or more cores, each being a microprocessor or like type processor element. The each core of CPU 108 can be any type of general-purpose central processing unit (CPU), such as an x86-based processor, ARM®-based processor, or the like. CPU 108 can include other support circuitry, such as cache memories, memory management units (MMUs), interrupt controllers, north bridge, south bridge, platform host controller, voltage regulators, firmware, and the like. Storage 112 includes local storage devices (e.g., one or more hard disks, flash memory modules, solid state disks, and optical disks) and/or a storage interface that enables computing system 100 to communicate with one or more network data storage systems. Examples of a storage interface are a host bus adapter (HBA) that couples computing system 100 to one or more storage arrays, such as a storage area network (SAN) or a network-attached storage (NAS), as well as other network data storage systems. IO devices 110 include conventional interfaces known in the art, such as one or more network interfaces, universal serial bus (USB) interfaces, Inter-Integrated Circuit (I²C) interfaces, serial peripheral interface (SPI) interfaces, 1-wire interfaces, general purpose input/output (GPIO) interfaces, and the like. NVM 114 is a device allowing information to be stored persistently regardless of the state of power applied to computing system 100 (e.g., FLASH memory or the like). NVM 114 stores firmware (FW) 116 for computing system 100, such as a Basic Input/Output System (BIOS), Unified Extensible Firmware Interface (UEFI), or the like.

Software platform 104 includes a host operating system (OS) 126, an Advanced Configuration and Power Interface (ACPI) subsystem 128, drivers 130, fallback drivers (OS portion) 122A, and applications 134. Host OS 126 cooperates with ACPI subsystem 128, drivers 130, and fallback drivers 132 to manage hardware platform 102. Host OS 126 also manages applications 134. Host OS 126 can be any commodity operating system known in the art, such as such as Linux®, Microsoft Windows®, Mac OS®, or the like.

At power-on of computing system 100, firmware 116 performs initialization of hardware platform 102. Firmware 116 is compliant with a version of the ACPI specification. The ACPI specification provides a register set and software framework that enables power management and system configuration without the need for a direct interface between host OS 126 and firmware 116. ACPI functions as an interface layer between firmware 116 and host OS 126. CPU 106, IO devices 110, and storage 112 can include the ACPI register set. ACPI subsystem 128 implements the ACPI software framework.

ACPI defines data tables and definition blocks. Data tables store data that can be read by host OS 126 and device drivers 130. Definition blocks include ACPI Machine Language (AML) byte code that is executable by an AML interpreter 129 in ACPI subsystem 128. AML byte code in definition blocks is compiled from the ACPI Source Language (ASL) code. During power-on initialization, firmware 116 stores ACPI tables 120 in system memory 108 for use by host OS 126. ACPI tables 120 include, for example, an Extended System Description Table (XSDT), Fixed ACPI Description Table (FADT), Differentiated System Description Table (DSDT), Secondary System Description Table (SSDT), as well as any other table defined by the ACPI specification.

Figure 3:
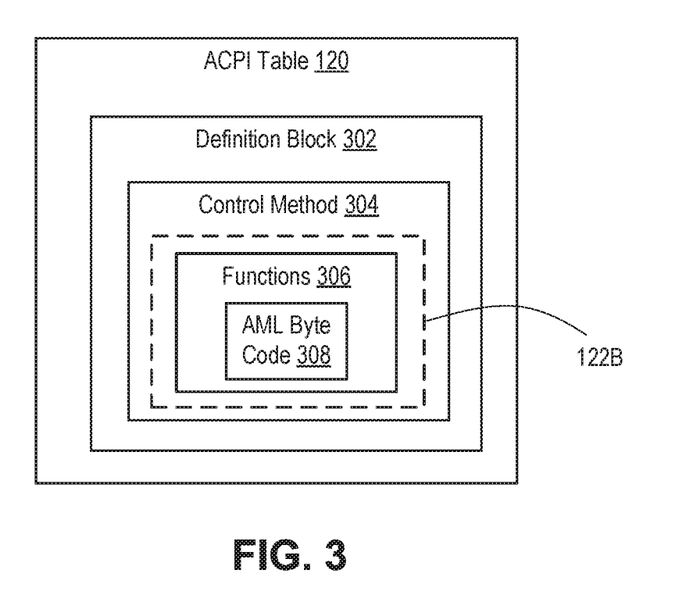
FIG. 3 is a block diagram depicting an Advanced Configuration and Power Interface (ACPI) table according to an embodiment.

FIG. 3 is a block diagram depicting an ACPI table 120 according to an embodiment. ACPI table 120 includes one or more definition blocks 302. Each definition block 302 includes one or more control methods 304. Each control method 304 includes one or more functions 306. Each function 306 is defined by AML byte code 308 executable by AML interpreter 129. AML byte code 308 can perform loop constructs, perform conditional evaluations, access defined address spaces, and the like.

Returning to FIG. 1, firmware 116 hands off execution to host OS 126 (e.g., a bootloader 127 of host OS 126). Bootloader 127 loads host OS 126 into system memory 108 and performs initialization of host OS 126. Bootloader 127 initializes ACPI subsystem 128. ACPI subsystem 128 processes ACPI tables 120 to generate an ACPI namespace 118 and initializes one or more ACPI address spaces 124. In particular, AML interpreter 129 executes AML byte code in definition blocks of ACPI tables 120 to construct ACPI namespace 118 and initializes ACPI address spaces 124. ACPI namespace 118 is a tree of objects that represent ACPI devices in computing system 100.

Figure 4:
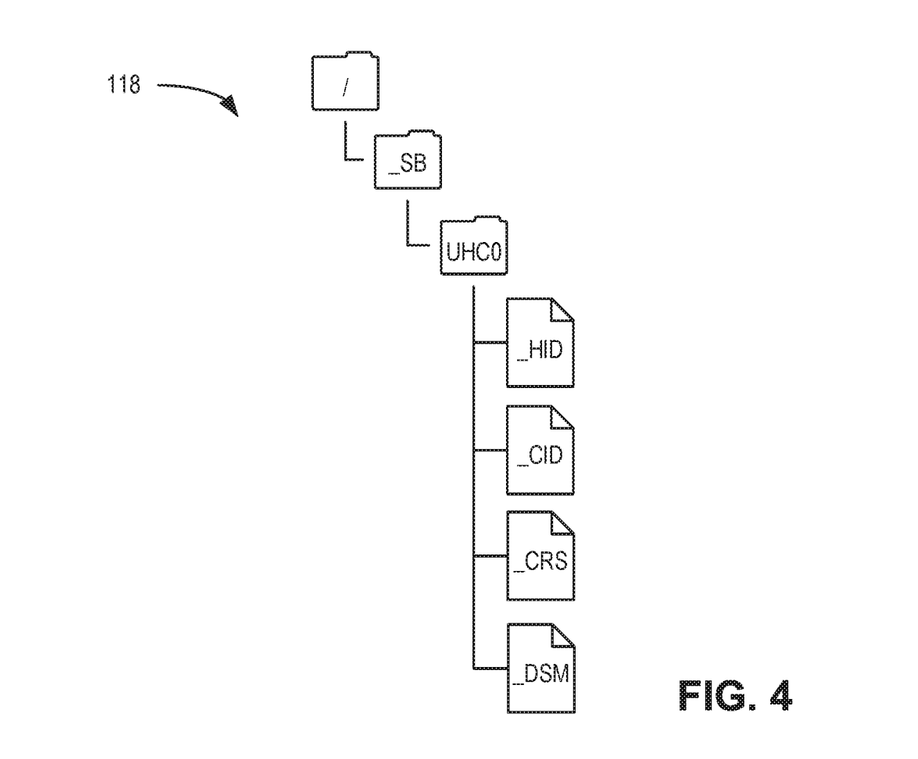
FIG. 4 illustrates a portion of an ACPI namespace according to an embodiment.

FIG. 4 illustrates a portion of ACPI namespace 118 according to an embodiment. ACPI namespace includes a root (designated "\"). The root includes a scope designated_SB (e.g., System Bus). A device "UHC0" is present under the \_SB scope. The device UHC0 includes various objects, including Hardware Identifier (_HID), Compatible Identifier (_CID), and Current Resources (_CRS) data objects, as well as a Device Specific Method (_DSM) control method. The HID object provides a device's unique ID. The _CID object provides a secondary identifier for a device. The _CRS object describes the system resources currently allocated to the device. The _DSM method is a control method that provides device specific control functions for a device. The device UHC0 can have other objects associated therewith within the ACPI namespace 118, such objects being omitted for clarity.

Returning to FIG. 1, ACPI address spaces 124 are defined by the ASL Operation Region (OpRegion) construct. An OpRegion defines the size and offset of a particular address space in system memory 108. Specific addresses in an OpRegion can then be accessed using named fields in ASL code. At runtime, AML code cannot access an ACPI address space defined by an OpRegion until ACPI subsystem 128 installs a handler for that ACPI address space. ACPI subsystem 128 can install default address space handlers for some address spaces (e.g., System Memory, System IO, Peripheral Component Interconnect (PCI) Configuration Space). Upon instruction, ACPI subsystem 128 can install user-defined address space handlers for other address spaces.

After ACPI subsystem 128 has initialized ACPI namespace 118 and one or more of ACPI address spaces 124, host OS 126 processes ACPI namespace 118 to match devices in hardware platform 102 to drivers in software platform 104. In some cases, host OS 126 can find a driver 130 for a given IO device 110 (e.g., a network driver for a network device). In other cases, host OS 126 cannot find a driver 130 for a given IO device 110. For example, host OS 126 may not have a driver 130 for an $I^2C$ device, SPI device, GPIO device, or the like. In an embodiment, host OS 126 uses a fallback driver for those IO devices 110 that do not have drivers 130. A fallback driver can support a subset of the functionality of a given IO device 110. For example, a fallback driver can support a serial interface having a transmit function, a receive function, and a status function. Host OS 126 can use such a fallback driver to access the transmit, receive, and status functionalities of a given IO device 110.

In an embodiment, a fallback driver includes an OS portion that is part of the software platform 104 (referred to as fallback driver portion 122A) and an AML byte code portion that is part of ACPI tables 120 generated by firmware 116 during power-on initialization (referred to as fallback driver portion 122B). Thus, a fallback driver 122 includes a fallback driver portion 122A and a fallback driver portion 122B. Fallback driver portion 122B includes AML byte code that, when executed by AML interpreter 129, interacts with an IO device 110 to implement the functionality of fallback driver 122 (e.g., a transmit function, a receive function, and a status function). Fallback driver portion 122A provides an interface to fallback driver portion 122B for use by host OS 126 and applications 134. Fallback driver portion 122A cooperates with ACPI subsystem 128 to call the functions implemented by fallback driver portion 122B. Fallback driver portion 122A can be a device driver stub that offloads driver functionality to AML byte code in ACPI tables 120. Fallback driver portion 122A can also be a virtual device driver (e.g., a character device driver) that makes an IO device 110 (e.g., a USB device) appear as a virtual device (e.g., a console).

Referring to FIGS. 3-4, in an embodiment, fallback driver portion 122B is implemented using a control method 204 defined for a given IO device 110 in an ACPI table 120. The functionality of fallback driver 122 is implemented using functions 206 of a control method 204. In an embodiment, fallback driver portion 122B is implemented using a DSM control function defined for a given IO device 110. Parameters of the control method can be used as parametric input values to the fallback driver functions. A return value of the control method can be used as parametric output of the fallback driver functions. In embodiments, the control method can leverage ACPI address spaces 124 (e.g., System Memory, System IO, PCI configuration) to provide parametric input and parametric output using buffers.

Example ASL pseudocode that implements a fallback driver for a device is shown below.

```
Device (\_SB.UHC0) { // USB-gadget based console.
      Name (_HID,"PROP1234")
      Name (_CID, "SSC0001")
      Name(_CRS, ResourceTemplate( ) {
           UARTSerialBus(115200, DataBitsEight, StopBitsOne, 00,
           LittleEndian,ParityTypeNone,FlowControlNone, 1,
           1, "UHC0", 0, ResourceConsumer, UHB0)
})
      Function(_DSM,{IntObj,BuffObj},{BuffObj, IntObj, IntObj,
      PkgObj})
{
           switch(Arg0) {
             case(ToUUID(".........")) {
                switch(Arg2) {
                  // Function 0: Return supported functions
                  case(0) {
                       return (Buffer( ) {0xF})
                  }
                  // Function 1:
                  case(1) {
                       // ... Logic to implement TX
                       Return(Zero)
                  }
                  // Function 2:
                  case(2) {
                       // ... Logic to implement RX
                       Return (received byte)
                  }
                  // Function 3:
                  case(2) {
                       // ...Logic to implement Line Status
                       Return(line status byte)
                  }
                  default {
                       BreakPoint
                  }
                }
             }
           //
           // If not one of the UUIDs we recognize, then return a buffer
           // with bit 0 set to 0 indicating no functions supported.
           //
           return(Buffer( ){0})
}
```

In the example ASL pseudocode, a device UHC0 in scope \_SB is defined. The device UHCO has an _HID of "PROP1234" and a _CID of "SSC0001." The HID is used to match a real device driver for the device UHC0. The _CID is used to match a fallback device driver for the device UHC0 in case there is no real device driver present in software platform 104. The ASL pseudocode defines a _CRS object that defines resources of the device UHC0 when a real device driver is used. The control function DSM for the device UHC0 includes a first argument (Arg0) that selects the interface to be used upon invocation. The interface is selected based on a universally unique identifier (UUID). A UUID can be assigned to the fallback driver (SSC0001). The control function _DSM then analyzes the third argument (Arg2) to determine which function of the fallback driver has been selected. In the embodiment, the fallback driver includes three functions designated function 1 (Transmit), function 2 (Receive), and function 3 (Status). A function 0 returns the supported functions of the fallback driver.

Figure 2:
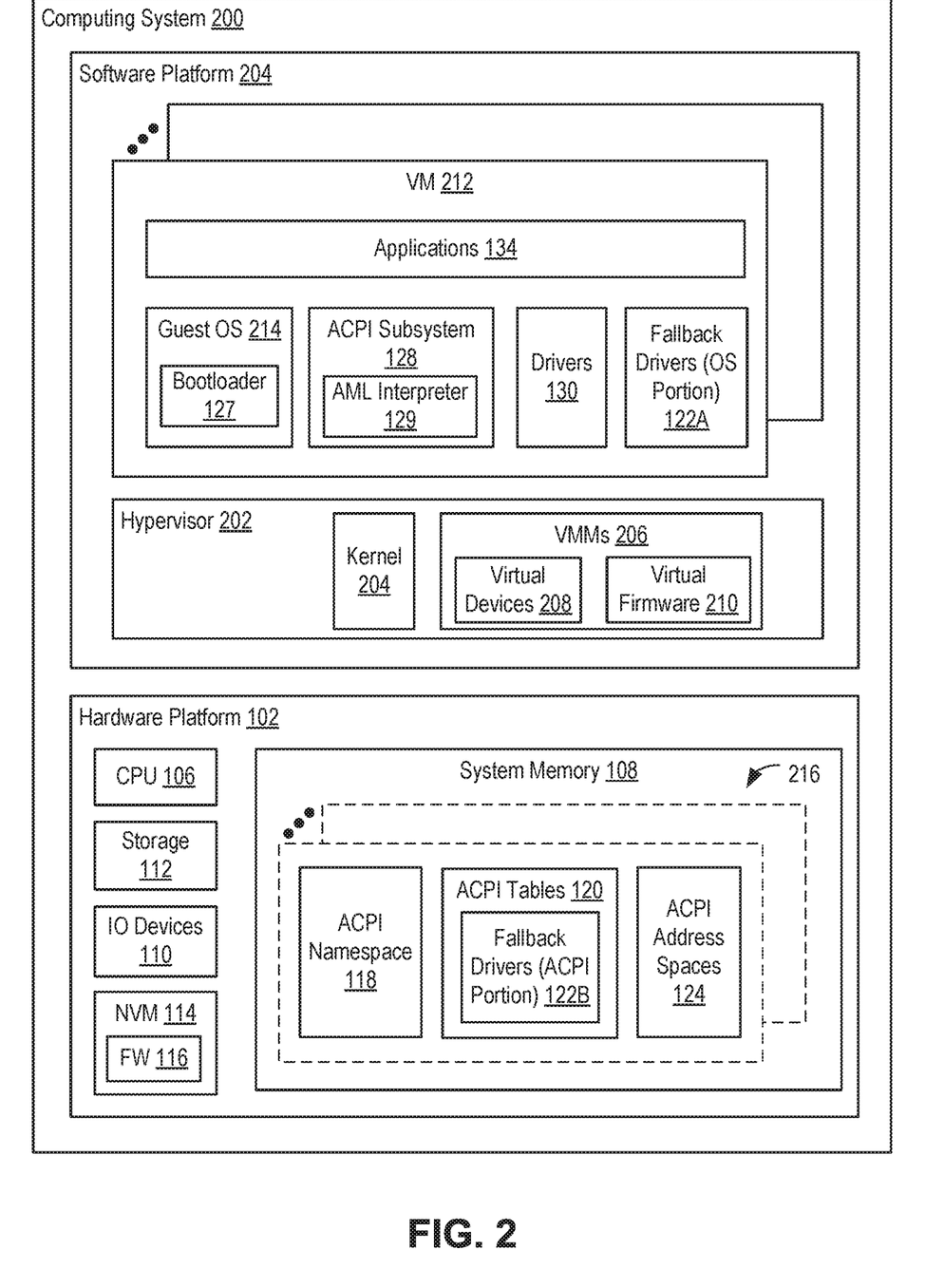
FIG. 2 is a block diagram depicting a virtualized computing system according to an embodiment.

FIG. 2 is a block diagram depicting a virtualized computing system 200 according to an embodiment. Elements of FIG. 2 that are the same or similar to those of FIG. 1 are designated with identical reference numerals. Virtualized computing system 100 includes hardware platform 102 and a software platform 204. Hardware platform 102 is configured as described above. Software platform 204 includes a virtualization layer that abstracts processor, memory, storage, and networking resources of hardware platform 102 into one or more virtual machines ("VMs") 212 that run concurrently on virtualized computing system 200. VMs 212 run on top of the virtualization layer, referred to herein as a hypervisor 202, which enables sharing of the hardware resources by VMs 212. One example of hypervisor 202 that may be used in an embodiment described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein).

Each VM 212 supported by hypervisor 202 includes guest software (also referred to as guest code) that runs on the virtualized resources supported by hardware platform 102. In the example shown, the guest software of each VM 212 includes a guest OS 214, ACPI subsystem 128, drivers 130, fallback driver portions 122A, and applications 134. Guest OS 134 can be any commodity operating system known in the art, such as such as Linux®, Microsoft Windows®, Mac OS®, or the like. Guest OS 214 functions similarly to host OS 126, but on virtualized hardware rather than the physical hardware of hardware platform 102.

Hypervisor 202 includes, among other components, a kernel 204 and virtual machine monitors (VMMs) 206. Kernel 204 provides operating system functionality (e.g., process creation and control, file system, process threads, etc.), as well as CPU scheduling and memory scheduling. VMMs 206 implement the virtual system support needed to coordinate operations between hypervisor 202 and VMs 212. Each VMM 206 manages a corresponding virtual hardware platform that includes emulated hardware, including virtual devices 208 and virtual firmware 210 (as well as other devices, such as virtual CPUs, guest physical memory, and the like). Virtual devices 208 include virtualized versions of IO devices 110 that are exposed to guest OS 214 in each VM 212. Virtualized firmware 210 functions similar to firmware 116 and is the firmware that initializes the virtualized hardware presented to guest OS 214 in each VM 212. Thus, the functions of firmware 116 discussed above, namely the initializing of ACPI tables 120, can also be performed by virtual firmware 210 on behalf of each VM 212. System memory 108 stores ACPI namespace 118, ACPI tables 120, and ACPI address spaces 124 in portions of guest physical memory 216 allocated to each VM 212. Otherwise, guest OS 214 functions similar to host OS 126 in generating ACPI namespace 118 and assigning drivers 130 and fallback drivers 122 to virtual devices 208.

Returning to FIG. 1, in an embodiment, host OS 126 can be replaced by a hypervisor (e.g., hypervisor 202). Hypervisor 202 is also an operating system that is specialized for virtualization. However, hypervisor 202 can perform similar functions as host OS 126, including generating ACPI namespace 118 and assigning drivers 130 and fallback drivers 122 to IO devices 110.

Figure 5:
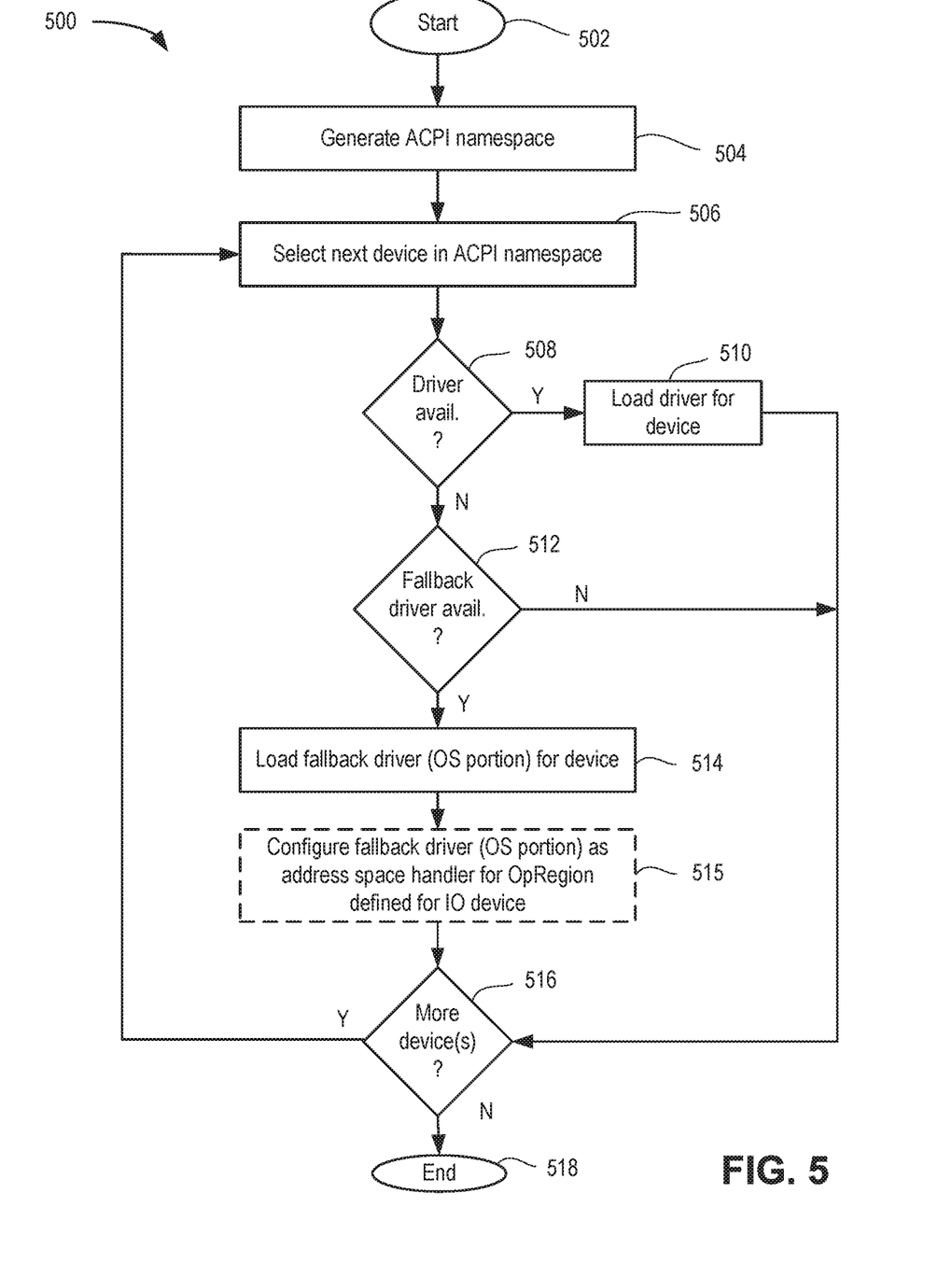
FIG. 5 is a flow diagram depicting a method of assigning drivers to devices in a computing system according to an embodiment.

FIG. 5 is a flow diagram depicting a method 500 of assigning drivers to devices in a computing system according to an embodiment. Method 500 can be performed by host OS 126, hypervisor 202, or a guest OS 214. For purposes of clarity by example, the component performing method 500 is referred to as the OS. Method 500 begins at step 502. At step 504, the OS generates ACPI namespace 118 based on ACPI tables 120. ACPI tables 120 are loaded into system memory 108 by firmware 116 or virtual firmware 210. At step 506, the OS selects a next device in ACPI namespace 118. At step 508, the OS determines if a driver 130 is available for the selected device. If so, method 500 proceeds to step 510, where the OS loads a driver 130 for the selected device. Method 500 then proceeds to step 516, where the OS determines if there are additional devices to process. If not, method 500 ends at step 518. If so, method 500 returns to step 506 to select the next device in ACPI namespace 118. The OS can determine if a driver 130 is available for the selected device by matching a driver 130 to the HID (e.g., a first identifier) of the selected device in ACPI namespace 118.

If at step 508 a driver 130 is not available for the selected device, method 500 proceeds to step 512. At step 512, the OS determines whether a fallback driver 122 is available for the selected device. If not, method 500 proceeds to step 516 and continues as described above. If a fallback driver is available, method 500 proceeds to step 514. The OS can determine if a fallback driver is available for the selected device by matching a fallback driver portion 122A to the CID (e.g., a second identifier) of the selected device in ACPI namespace 118.

At step 514, the OS loads a fallback driver portion 122A for the selected device (e.g., a drive stub, virtual device driver, or the like). Fallback driver portion 122A calls into ACPI subsystem 128 to invoke fallback driver portion 122B defined by AML byte code in ACPI tables 120. Method 500 proceeds from step 514 to step 516 and continues as described above.

Figure 6:
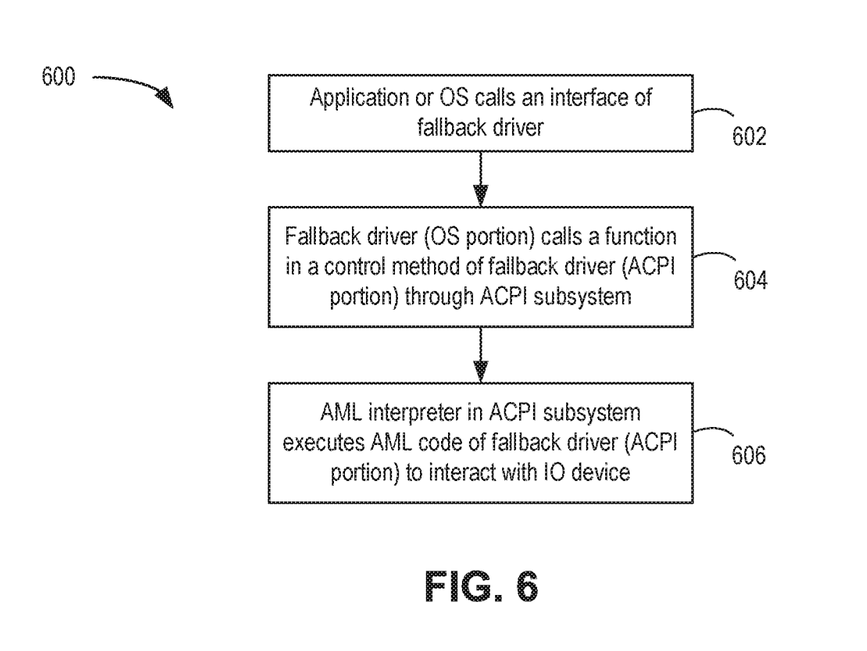
FIG. 6 is a flow diagram depicting a method of accessing an IO device by an application or operating system according to an embodiment.

FIG. 6 is a flow diagram depicting a method 600 of accessing an IO device by an application or operating system according to an embodiment. In method 600, the OS can be host OS 126, hypervisor 202, or guest OS 214. Further, the IO device is supported by a fallback driver 122. Method 600 begins at step 602, where the application or the OS calls an interface of fallback driver 122. Fallback driver 122 can include multiple interfaces that support at least a subset of the functionality of the IO device (e.g., transmit, receive, and status interfaces). At step 604, fallback driver portion 122A calls a function in a control method of fallback driver portion 122B through ACPI subsystem 128. At step 606, AML interpreter 129 executes AML code of fallback driver portion 122B to interact with the IO device.

In the example of FIG. 6 above, an application or OS is accessing the IO device. In some embodiments, a control method defined in an ACPI table 120, when executed by AML interpreter 129, may access the IO device via an ACPI address space 124 defined by an OpRegion for the IO device. Such a scenario involves AML interpreter reentrancy and ACPI subsystem 128 must be configured to support such reentrancy. In such case, as shown in FIG. 5, the OS can configure fallback driver portion 122A as an address space handler for the OpRegion defined for the IO device (optional step 515). The OS cooperates with ACPI subsystem 128 to install fallback driver portion 122A as the address space handler.

Figure 7:
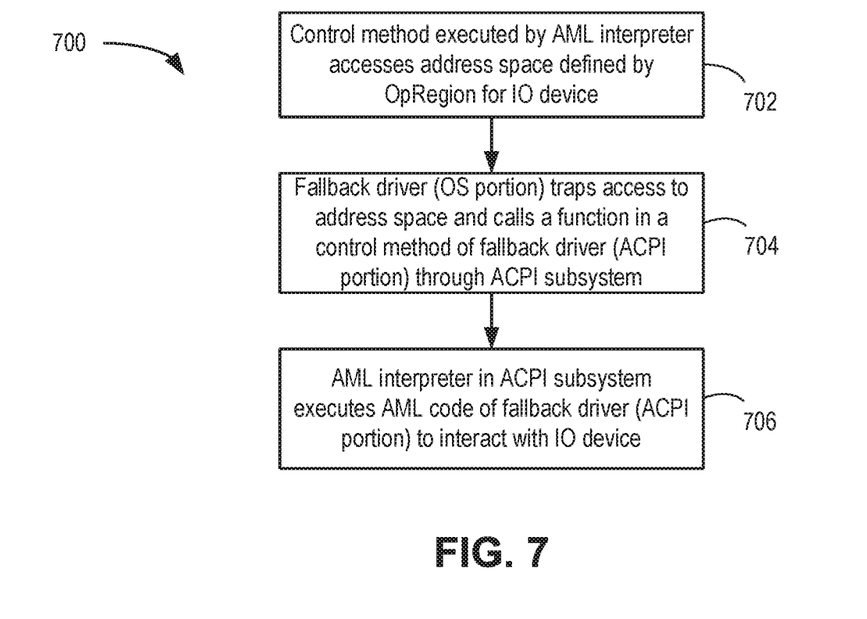
FIG. 7 is a flow diagram depicting a method of accessing an IO device by a control method executed by an ACPI Machine Language (AML) interpreter in an ACPI subsystem according to an embodiment.

FIG. 7 is a flow diagram depicting a method 700 of accessing an IO device by a control method executed by an AML interpreter in an ACPI subsystem according to an embodiment. Method 700 begins at step 702, where AML interpreter 129, in a first context, executes a control method, which accesses an ACPI address space 124 defined by an OpRegion for the IO device. At step 704, fallback driver portion 122A traps access to ACPI address space 124 as the handler for such address space. Fallback driver portion 122A calls a function in a control method of fallback driver portion 122B through ACPI subsystem 128. At step 706, AML interpreter 129, in a second context, executes AML code of fallback driver portion 122B to interact with the IO device.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of providing software support of an input/output (IO) device of a computing system having an advanced configuration and power interface (ACPI) subsystem executing therein, the method comprising:
processing an ACPI namespace to determine first and second identifiers of the IO device;
determining absence of a device driver for the IO device based on the first identifier; and
loading a first fallback device driver portion based on the second identifier, the first fallback device driver portion providing an interface to a control method in the ACPI namespace, the control method executable by the ACPI subsystem to implement a second fallback device driver portion that supports at least a portion of functionality for the IO device.

2. The method of claim 1, wherein the ACPI subsystem is a portion of a host operating system (OS), hypervisor, or guest OS.

3. The method of claim 1, further comprising:
configuring the first fallback device driver portion as an address space handler in the ACPI subsystem for an address space assigned to the IO device, the address space defined by an operation region (OpRegion) in a definition block of an ACPI table.

4. The method of claim 1, wherein the control method includes a first function for receiving data from the IO device, a second function for transmitting data to the IO device, and a third function for returning status of the IO device.

5. The method of claim 1, wherein the control method is an interface of a device specific method (_DSM) in the ACPI namespace.

6. The method of claim 1, wherein the first identifier is a hardware identifier (_HID) of the IO device in the ACPI namespace, and wherein the second identifier is a compatible identifier (_CID) of the IO device in the ACPI namespace.

7. The method of claim 1, wherein the control method comprises ACPI machine language (AML) byte code defined in a definition block of an ACPI table.

8. A non-transitory computer readable medium having instructions stored thereon that when executed by a processor cause the processor to perform a method of providing software support of an input/output (IO) device of a computing system having an advanced configuration and power interface (ACPI) subsystem executing therein, the method comprising:
processing an ACPI namespace to determine first and second identifiers of the IO device;
determining absence of a device driver for the IO device based on the first identifier; and
loading a first fallback device driver portion based on the second identifier, the first fallback device driver portion providing an interface to a control method in the ACPI namespace, the control method executable by the ACPI subsystem to implement a second fallback device driver portion that supports at least a portion of functionality for the IO device.

9. The non-transitory computer readable medium of claim 8, wherein the ACPI subsystem is a portion of a host operating system (OS), hypervisor, or guest OS.

10. The non-transitory computer readable medium of claim 8, further comprising:
configuring the first fallback device driver portion as an address space handler in the ACPI subsystem for an address space assigned to the IO device, the address space defined by an operation region (OpRegion) in a definition block of an ACPI table.

11. The non-transitory computer readable medium of claim 8, wherein the control method includes a first function for receiving data from the IO device, a second function for transmitting data to the IO device, and a third function for returning status of the IO device.

12. The non-transitory computer readable medium of claim 8, wherein the control method is an interface of a device specific method (_DSM) in the ACPI namespace.

13. The non-transitory computer readable medium of claim 8, wherein the first identifier is a hardware identifier (_HID) of the IO device in the ACPI namespace, and wherein the second identifier is a compatible identifier (_CID) of the IO device in the ACPI namespace.

14. The non-transitory computer readable medium of claim 8, wherein the control method comprises ACPI machine language (AML) byte code defined in a definition block of an ACPI table.

15. A computing system, comprising:
a hardware platform including a processor, memory, and an input/output (IO) device; and
a software platform executing on the hardware platform, the software platform including an advanced configuration and power interface (ACPI) subsystem executing therein, the software platform executable by the processor to:
process an ACPI namespace to determine first and second identifiers of the IO device;
determine absence of a device driver for the IO device based on the first identifier; and
load a first fallback device driver portion based on the second identifier, the first fallback device driver portion providing an interface to a control method in the ACPI namespace, the control method executable by the ACPI subsystem to implement a second fallback device driver portion that supports at least a portion of functionality for the IO device.

16. The computing system of claim 15, wherein the software platform includes a host operating system (OS), hypervisor, or guest OS, and wherein the ACPI subsystem is a portion of a host operating system (OS), hypervisor, or guest OS.

17. The computing system of claim 15, wherein the software platform is executable by the processor to:
configure the first fallback device driver portion as an address space handler in the ACPI subsystem for an address space assigned to the IO device, the address space defined by an operation region (OpRegion) in a definition block of an ACPI table.

18. The computing system of claim 15, wherein the control method includes a first function for receiving data from the IO device, a second function for transmitting data to the IO device, and a third function for returning status of the IO device.

19. The computing system of claim 15, wherein the control method is an interface of a device specific method (_DSM) in the ACPI namespace.

20. The computing system of claim 15, wherein the control method comprises ACPI machine language (AML) byte code defined in a definition block of an ACPI table.

* * * * *